(12) United States Patent
Alba et al.

(10) Patent No.: US 9,205,978 B2
(45) Date of Patent: Dec. 8, 2015

(54) SYSTEM FOR THE TRANSFER, STORAGE AND DISTRIBUTION OF INTERMODAL CONTAINERS

(75) Inventors: David Alba, Azusa, CA (US); Samuel Alba, Montebello, CA (US)

(73) Assignee: SUPERDOCK, LLC, Rancho Cucamonga, CA (US)

( * ) Notice: Subject to any disclaimer, the term of this patent is extended or adjusted under 35 U.S.C. 154(b) by 185 days.

(21) Appl. No.: 13/695,422

(22) PCT Filed: Apr. 29, 2011

(86) PCT No.: PCT/US2011/034688
§ 371 (c)(1),
(2), (4) Date: May 24, 2013

(87) PCT Pub. No.: WO2011/137402
PCT Pub. Date: Nov. 3, 2011

(65) Prior Publication Data
US 2013/0236284 A1 Sep. 12, 2013

Related U.S. Application Data

(60) Provisional application No. 61/343,568, filed on Apr. 30, 2010.

(51) Int. Cl.
*B65G 63/00* (2006.01)
*B65G 67/60* (2006.01)
(Continued)

(52) U.S. Cl.
CPC ............ *B65G 1/0464* (2013.01); *B65G 63/004* (2013.01); *B65G 67/603* (2013.01); *B66C 19/002* (2013.01); *B65G 57/03* (2013.01)

(58) Field of Classification Search
CPC ......... B63B 25/00; B61B 13/00; B61F 11/00; B65G 67/60; E01B 25/00
USPC ......... 212/324, 325; 414/137.1, 139.4, 139.9, 414/139–140.5, 140.1, 140.3, 140.4, 141.3, 414/141.4, 234, 242, 282, 281, 286, 342, 414/626
See application file for complete search history.

(56) References Cited

U.S. PATENT DOCUMENTS

| 360,655 A | 4/1887 | Carpenter |
| 5,090,515 A * | 2/1992 | Takahashi et al. ............ 187/249 |

(Continued)

FOREIGN PATENT DOCUMENTS

| DE | 4439740 C1 * | 5/1996 | ............ B65G 63/00 |
| JP | 07-503049 | 3/1995 | |

(Continued)

OTHER PUBLICATIONS

International Preliminary Report on Patentability of corresponding International Application No. PCT/US2011/034688 date of Issuance Nov. 6, 2012.

(Continued)

*Primary Examiner* — Gregory Adams
(74) *Attorney, Agent, or Firm* — Snell & Wilmer L.L.P.

(57) ABSTRACT

A system for the transfer, storage and distribution of intermodal containers of a plurality of lengths. The system comprises a first storage area comprising a first plurality of shafts arranged in a grid pattern along a first and second axis, a plurality of gantry cranes slidably disposed along the first axis and extending beyond the storage area, a roof structure disposed at a distance above the plurality of shafts, and a plurality of overhead cranes slidably associated with the plurality of tracks. The shafts disposed in rows along the first axis are configured to store intermodal containers of a plurality of lengths. The shafts disposed in a given row along the second axis are configured to store intermodal containers of a corresponding length. The plurality of gantry cranes are each configured to attach to and transport an intermodal container from a first location to one of a plurality of platforms slidably disposed along the first axis. The platforms delivering the intermodal container to one of the rows of the shafts along the first axis are based on the length of the intermodal container. The roof structure comprises a plurality of tracks corresponding to the rows of the shafts along the second axis. The overhead cranes are each configured to attach to and transport the intermodal container from the platforms to either one of the shafts or to a second location.

27 Claims, 10 Drawing Sheets

(51) Int. Cl.
  *B65G 1/04* (2006.01)
  *B66C 19/00* (2006.01)
  *B65G 57/03* (2006.01)

(56) References Cited

U.S. PATENT DOCUMENTS

| | | | |
|---|---|---|---|
| 5,421,688 A | 6/1995 | Füchtey et al. | |
| 5,882,164 A | 3/1999 | Rapeli et al. | |
| 5,951,226 A * | 9/1999 | Fantuzzi | 414/141.3 |
| 6,068,435 A * | 5/2000 | Borjesson | 414/139.9 |
| 2002/0102150 A1 | 8/2002 | Dunstan | |
| 2008/0011182 A1 | 1/2008 | Di Rosa et al. | |
| 2008/0075569 A1* | 3/2008 | Benedict et al. | 414/269 |
| 2008/0112779 A1* | 5/2008 | Amoss et al. | 414/137.9 |
| 2008/0213073 A1 | 9/2008 | Benedict et al. | |

FOREIGN PATENT DOCUMENTS

| | | | | |
|---|---|---|---|---|
| JP | 09-110176 | | 4/1997 | |
| JP | 10139168 A | * | 5/1998 | B65G 63/00 |
| JP | 11-286303 | | 10/1999 | |
| JP | 2000203720 A | * | 7/2000 | B65G 63/00 |
| JP | 2000-255786 | | 9/2000 | |
| JP | 2002068481 A | * | 3/2002 | B65G 63/00 |
| JP | 2005075537 A | * | 3/2005 | B65G 63/00 |
| JP | 2007223782 A | * | 9/2007 | B65G 63/00 |
| WO | WO 2004071911 A1 | * | 8/2004 | B65G 63/00 |
| WO | WO 2004074147 A1 | * | 9/2004 | B65G 63/00 |
| WO | 2011137402 A1 | | 11/2011 | |

OTHER PUBLICATIONS

International Search Report of corresponding International Application No. PCT/US2011/0034688 dated Jul. 22, 2011; total 2 pages.

* cited by examiner

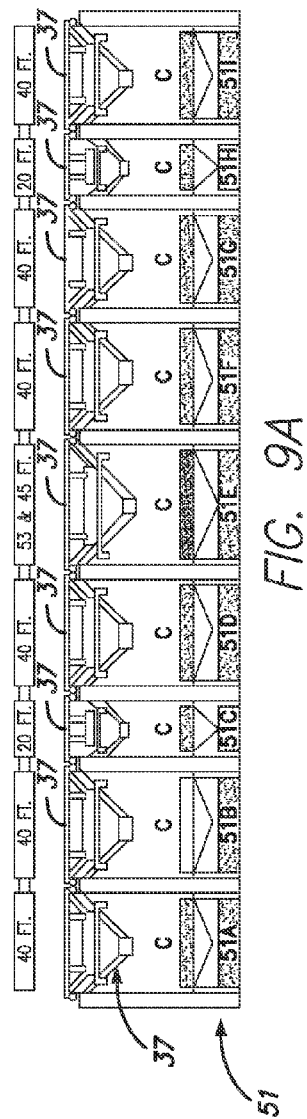
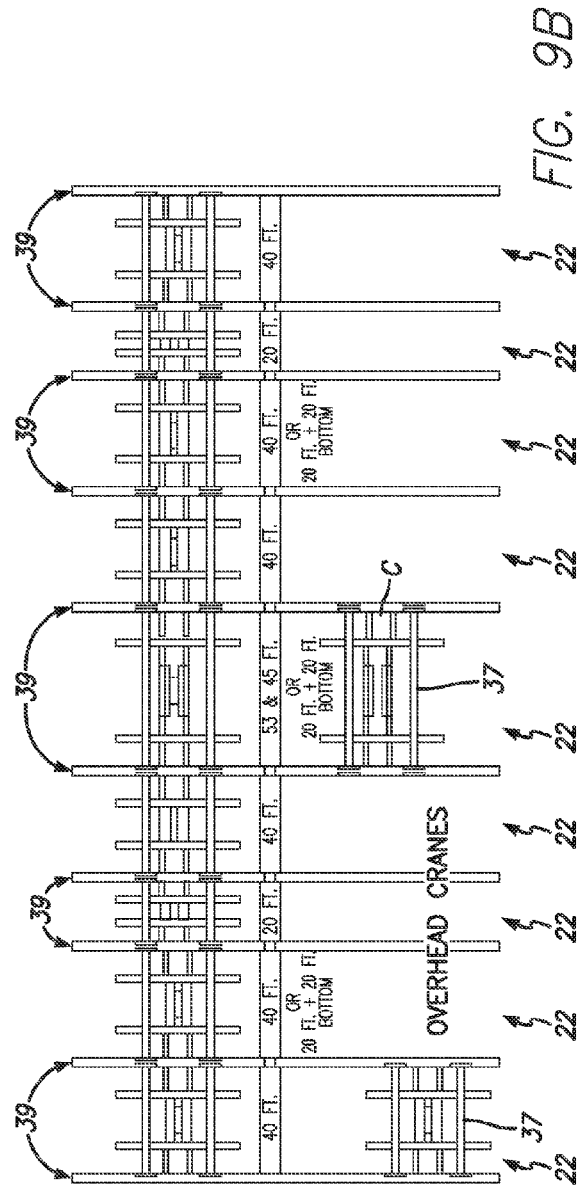
FIG. 9A
FIG. 9B

SYSTEM FOR THE TRANSFER, STORAGE AND DISTRIBUTION OF INTERMODAL CONTAINERS

CROSS-REFERENCE TO RELATED APPLICATIONS

This present application is a U.S. National Stage entry under 35 U.S.C. §371 of International Application No. PCT/US2011/034688, filed Apr. 29, 2011, which claims the benefit of U.S. Provisional Patent Application No. 61/343,568, filed Apr. 30, 2010, which applications are herein incorporated by reference in their entirety.

FIELD OF THE INVENTION

The invention relates generally to a system for the transfer, storage and distribution of intermodal containers.

BACKGROUND

In the global industry of international trade goods movement, the primary method of shipping involves the use of transoceanic ships, trains, and trucks. Marine terminals have been the primary facilities in which ships specifically built to deliver containers are moored under gantry cranes specifically designed to transfer containers and cargo onto and off these container ships. Pier side gantry cranes, massive in structure, are aligned parallel and adjacent to the waters edge and are positioned with the crane booms outstretched over the water. This area of crane position and the area of land immediately under and surrounding these cranes is referred to on the west coast longshoreman's vernacular as the highline.

The large land area immediately further inland is typically surfaced by blacktop, concrete or firm paving which create a surface upon which vehicles transport containers to and from the pier side gantry crane area highline. This large land area immediately further inland is designated for the temporary storage, stacking or parking via wheeled chassis of containers and is referred to as the container yard. Typically, another large flat paved surface area of land within the marine terminal usually adjacent to the container yard area is referred to as the on dock rail yard. This section of land is dedicated to containers assigned to intermodal transfer via train. The gate is the entrance and egress area of the marine terminal whereby trucks enter and leave the facility carrying the containers whereby the use of a wheeled chassis or flatbed is required to make a container mobile.

For decades, attempts have been made to invent facilities, apparatus, or automated storage and retrieval systems specifically designed to improve the utility of intermodal container transfer currently practiced by railroads, conventional marine terminal operators, and stevedores.

BRIEF SUMMARY

A system for the transfer, storage and distribution of intermodal containers of a plurality of lengths is described. The system comprises a first storage area comprising a first plurality of shafts arranged in a grid pattern along a first and second axis. The shafts disposed in rows along the first axis are configured to store intermodal containers of a plurality of lengths. The shafts disposed in a given row along the second axis are configured to store intermodal containers of a corresponding length. The system also comprises a plurality of gantry cranes slidably disposed along the first axis and extending beyond the storage area. The plurality of gantry cranes are each configured to attach to and transport an intermodal container from a first location to one of a plurality of platforms slidably disposed along the first axis. The platforms are configured to deliver the intermodal container to one of the rows of the shafts along the first axis based on the length of the intermodal container. A roof structure is disposed at a distance above the plurality of shafts, the roof structure comprising a plurality of tracks corresponding to the rows of the shafts along the second axis. A plurality of overhead cranes are slidably associated with the plurality of tracks. The overhead cranes are each configured to attach to and transport the intermodal container from the platforms to either one of the shafts or to a second location which may be a tunnel car or a land side docking area.

In accordance with a first aspect, the gantry cranes are disposed on the roof structure.

In accordance with a second aspect, the first axis is substantially parallel to a quayside axis of a port and the second axis is substantially perpendicular to the first axis.

In accordance with a third aspect, the shafts disposed in each row corresponding to the second axis are configured to store intermodal containers of uniform lengths.

In accordance with a fourth aspect, the shafts disposed in at least one row along the second axis are configured to store intermodal containers within a range of lengths.

In accordance with a fifth aspect, the first location is a container ship and the second location comprises any one or more of a tunnel car or a land-side docking area.

In accordance with a sixth aspect, the tunnel car is configured to traverse the rows of the shafts disposed on the first axis. The tunnel car is configured to receive an intermodal container from one of the plurality of overhead containers and deliver the intermodal container to another one of the plurality of overhead cranes.

In accordance with a seventh aspect, the tunnel car travels along a pathway that is substantially parallel to the first axis and located below the plurality of overhead cranes.

In accordance with an eighth aspect, the system further comprises a land-side docking area comprising any one or more of a rail train or an intermodal land vehicle.

In accordance with a ninth aspect, the rail train comprises a plurality of carbodies. Each carbody is configured to support at least one intermodal container based on their respective lengths and the plurality of carbodies are arranged in an order based on their respective container length capacities corresponding to the arrangement of the lengths of the intermodal containers contained in at least a subset of the row of storage shafts along the first axis.

In accordance with a tenth aspect, the distance between adjacent carbodies is configured to correspond to the distance between adjacent intermodal containers stored in the subset of the row of storage shafts along the first axis.

In accordance with an eleventh aspect, each carbody has an assigned overhead crane. The plurality of assigned overhead cranes are configured to load and unload a plurality of intermodal containers onto and from the container platforms of the rain train either separately or simultaneously.

In accordance with a twelfth aspect, one of a plurality of platforms is assigned to one of a plurality of gantry cranes.

In accordance with a thirteenth aspect, the platforms are each configured to support at least two intermodal containers at a first and second staging area separately accessible by the overhead cranes and the gantry crane, respectively.

In accordance with a fourteenth aspect, the platform further comprises a mechanism to move intermodal containers between the first and second staging areas.

In accordance with a fifteenth aspect, the system further comprises a bulk platform located external to the storage area. The bulk platform is configured to receive cargo that is not an intermodal container and transported the cargo to a third location outside of the storage area.

In accordance with a sixteenth aspect, the system further comprises sensors to communicate the location of the intermodal containers on the platform and/or within the storage area.

In accordance with a seventeenth aspect, the shafts are interconnected rectangular modules constructed from structural girders.

In accordance with an eighteenth aspect, the shafts each comprise cell guide tracks forming an aligned plurality of the container cell bays.

In accordance with a nineteenth aspect, the container cell bays are rectangular sections and configured to support a container of a corresponding length.

In accordance with a twentieth aspect, the shafts each comprise a floor that is adjustable to any one of a plurality of heights above ground level.

In another embodiment, twenty-first aspect, the system further comprises a second storage area comprising a second plurality of shafts arranged in a grid pattern along the first and second axis. The shafts disposed in rows along the first axis are configured to store intermodal containers of a plurality of lengths and the shafts disposed in a given row along the second axis are configured to store intermodal containers of a corresponding length. The system further comprises a second roof structure disposed at a distance at least above the second storage area. The roof structure comprises a plurality of tracks corresponding to the rows of the shafts disposed along the second axis.

In accordance with a twenty-second aspect, the first and second roof structures, including the plurality of tracks, are coextensive to provide an extended path for the overhead cranes to the second plurality of shafts.

In accordance with a twenty-third aspect, the system further comprises a second plurality of gantry cranes slidably disposed along the first axis and extending outside of the second storage area. The second plurality of gantry cranes each configured to attach to and transport an intermodal container to and from an intermodal land area adjacent the second storage area.

In accordance with a twenty-fourth aspect, the system further comprises a transfer storage area located remotely from the first storage area. The transfer storage area comprises a third plurality of shafts arranged in a grid pattern along a first and second axis. The shafts disposed in rows along the first axis are configured to store intermodal containers of a plurality of lengths corresponding to the arrangement of the lengths of intermodal containers on the carbodies of the rail train.

In accordance with a twenty-fifth aspect, the system further comprises a rail network accessing the first storage area and the transfer storage area. The rail network may be part of a substantially subterranean network.

In accordance with a twenty-sixth aspect, the subterranean network further comprises access for utility lines and access to at least one passenger transportation network.

Other objects, features and advantages of the described preferred embodiments will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

Preferred and non-limiting embodiments of the invention may be more readily understood by referring to the accompanying drawings in which:

FIGS. 9A and 9B illustrate the relationship between the overhead cranes and the carbodies and the relationship between the storage shafts and the carbodies, each with respect to the plurality of container lengths.

Like numerals refer to like parts throughout the several views of the drawings.

DETAILED DESCRIPTION OF THE PREFERRED EMBODIMENTS

Figure 1:
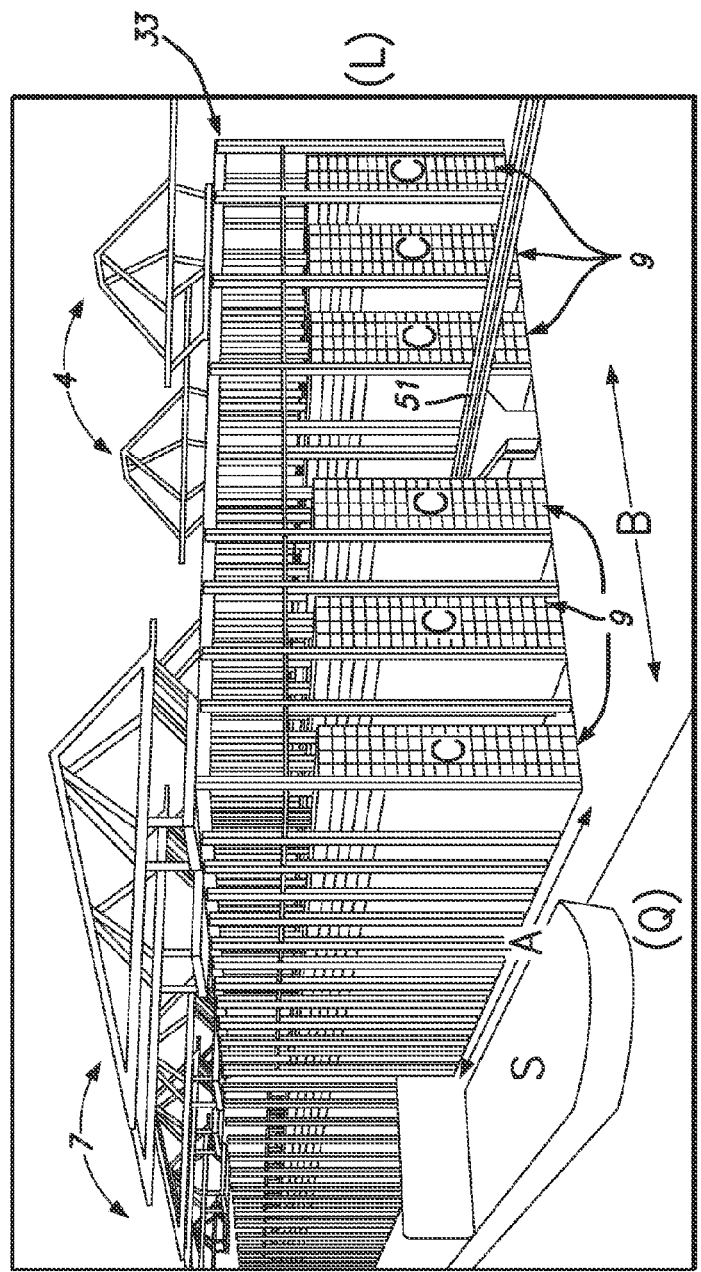
FIG. 1 is a perspective view of one embodiment of a system for the transfer, storage and distribution of intermodal containers of a plurality of lengths.

Specific, non-limiting embodiments of the present invention will now be described with reference to the drawings. It should be understood that such embodiments are by way of example only and merely illustrative of but a small number of embodiments within the scope of the present invention. Various changes and modifications obvious to one skilled in the art to which the present invention pertains are deemed to be within the spirit, scope and contemplation of the present invention as further defined in the appended claims.

The various embodiments disclosed herein are directed to a system for the transfer, storage and distribution of intermodal containers of a plurality of lengths. Among the many advantages of this system is the concentration and automation of freight terminal operations within a structural network. Within this structural network, intermodal containers of a plurality of sizes are preferably stored in a predetermined and repeating pattern based at least on the relative dimensions of the intermodal containers. The intermodal containers may be transported to and from the structural network by intermodal marine or land vehicles which are configured to receive and transport the intermodal containers in the corresponding predetermined pattern. As a result of the congruence between configuration of the stored intermodal containers and configuration of the intermodal marine or land vehicles adapted to receive the intermodal containers, the loading and unloading of the intermodal containers may be performed synchronously between the structural network and the intermodal marine or land vehicles.

FIGS. 1-6 depict aspects of a system 1 located in a marine terminal having a waterside W (also referred to as quayside Q) docking area for container ships S and a land-side docking area Y for land-based freight transport.

In a preferred embodiment, the system 1 includes a plurality of quayside gantry cranes 7 slidably supported along a first axis A-A by one or more rails 10 disposed on top of a roof structure 33. A plurality of land-side gantry cranes 4 may additionally be provided in a manner similar to the quayside gantry cranes 7 on an opposing side of the quayside gantry cranes 7. The land-side gantry cranes 4 may be disposed on top of a roof structure 33 that is separate or congruent with the roof structure 33 of the quayside gantry cranes 7. In providing both quayside and landside gantry cranes 7, 4, the system 1 permits access by any number of different intermodal transportation vehicles and allows for any number of simultaneous operations relating to the transfer and distribution of intermodal containers C stored therewithin or directly between different types of intermodal transportation vehicles (e.g., between container ship C and land vehicles).

The operation of the system 1 will now be described in the context of transfer, storage and distribution of intermodal containers from the container ship S to the rail train 51.

The quayside gantry cranes 7 align their boom and hoist lifts 2 by slidably moving along the rails 10 along the first axis A-A to attach to intermodal containers C on the docked container ship S. The roof structure 33 spans an area at a distance above a plurality of vertically disposed storage shafts 9 and include a plurality of parallel tracks along the second axis B-B that each support a plurality of overhead cranes 37 that provide access for the intermodal containers C to and from the storage shafts 9 disposed underneath the roof structure 33.

Figure 2:
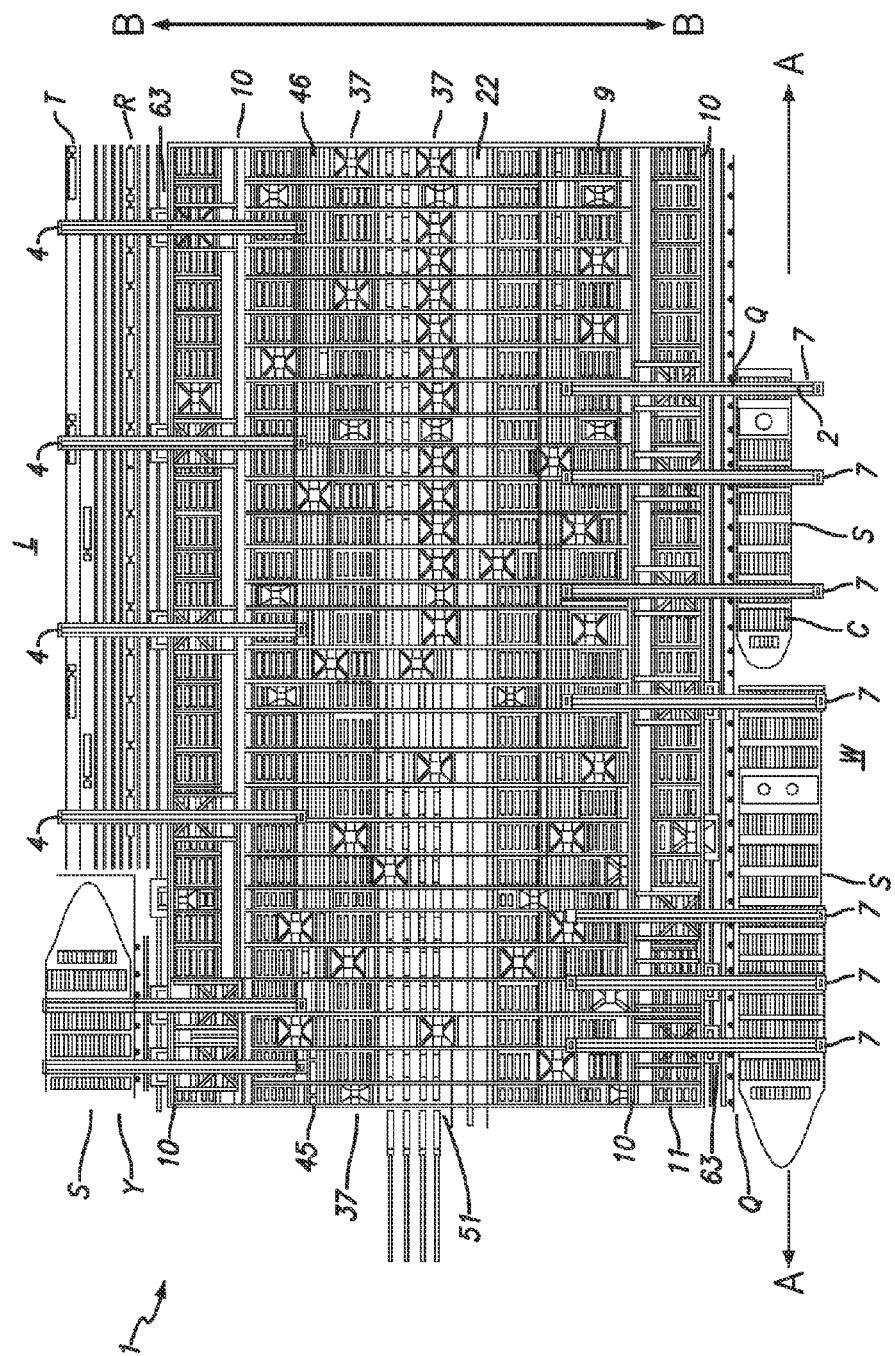
FIG. 2 is a top plan view of the embodiment of the system depicted in FIG. 1.
Figure 3:
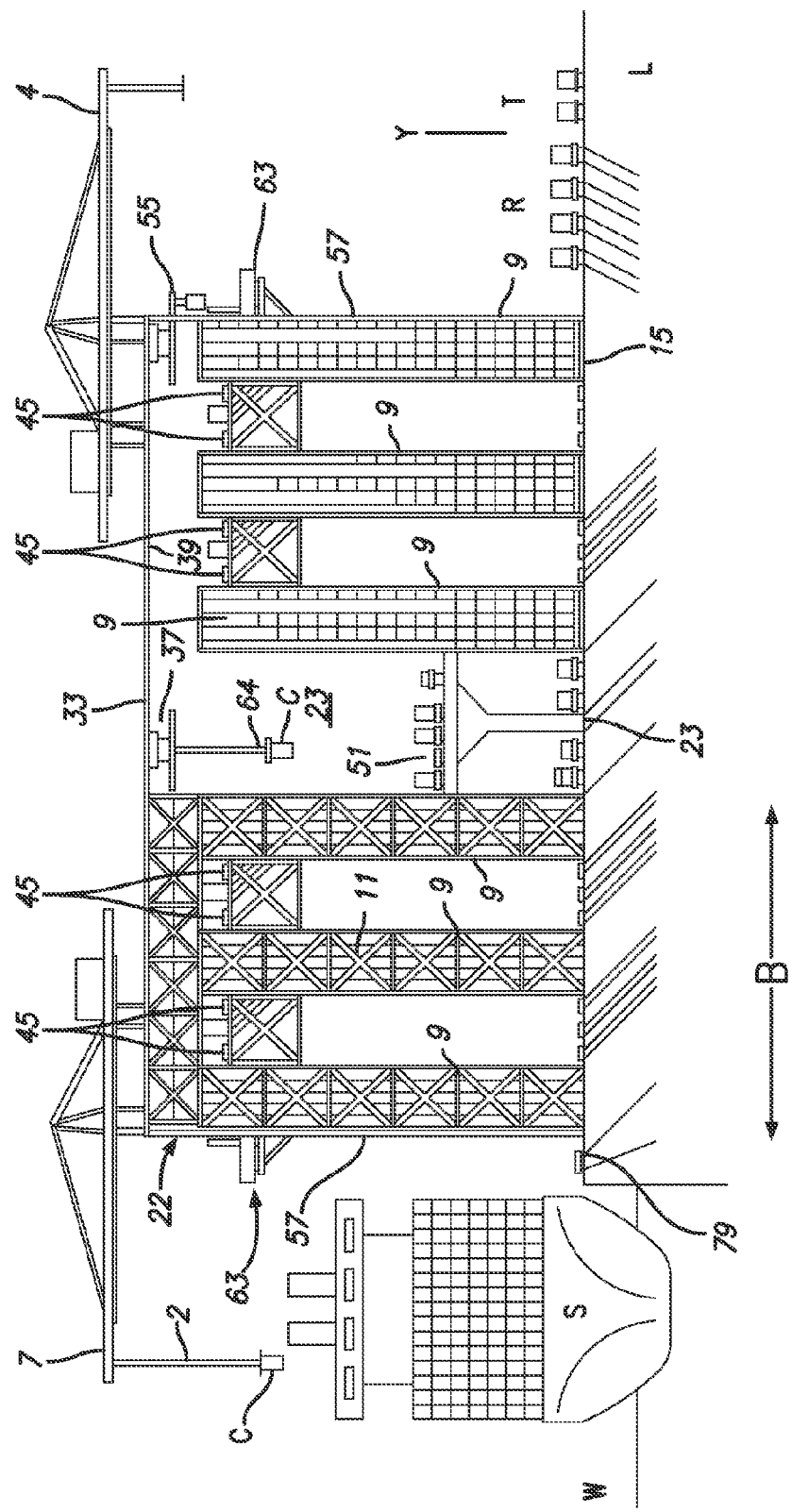
FIG. 3 is a side cross-sectional view of the embodiment of the system depicted in FIG. 1.

Both the quayside and land-side gantry cranes 7, 4 depicted in FIGS. 1-3 differ from the freestanding gantry cranes currently used in marine ports in that the quayside and land-side gantry cranes 7, 4 do not have the bulky supporting framework required of the freestanding gantry cranes, which occupy significant areas of land that cannot be put to other uses. Because the quayside and land-side gantry cranes 7, 4 are mounted on the roof structure 33, the space underneath them may be occupied by storage shafts 9 which store intermodal containers C.

With respect to transporting cargo which is not disposed in a standard intermodal container, a bulk platform 79. This bulk platform 79 is configured to receive cargo and is disposed on a separate rail external to the storage area to transport the bulk platform 79 to another area for further storage or transportation another intermodal vehicle.

Returning now to the exemplary operation of the system 1, the quayside gantry cranes 7 each utilize a hoist lift 2 to attach a container C on the container ship S and deliver the attached container C to one of a plurality of platforms 63. In a preferred embodiment, each quayside gantry crane 7 has at least one platform 63 assigned to it.

The platforms 63 are slidably disposed along the outer perimeter of the storage area along the first axis A-A along a linear track 62 that is welded, bolted or otherwise fastened to an outer wall 57 of the structural network. The platforms 63 deliver the container C to one of a plurality of overhead cranes 37 which provide ingress to a plurality of storage shafts 9 disposed in rows along a second axis B-B. In a preferred embodiment, the second axis B-B is substantially perpendicular to the first axis A-A and each track is has a defining hallway 22 having a width configured to accommodate a given length of a container C. Thus, each overhead crane 37 is associated with one of a plurality of storage shafts 9 which are specially configured to store a containers C of a corresponding length.

The platforms 63 may include sensors to register information about the container C disposed thereupon, such as its dimensions, contents, origin, destination, and any other information relevant to the transportation or storage of the container. The platforms 63 deliver the container C to the appropriate overhead crane 37 that accesses storage shafts 9 configured to store the container C based on its length. In a preferred embodiment, the platform 63 is configured to support at least two intermodal containers C at a first and second staging area 67, 69 which is separately accessible by the overhead cranes 37 and the quayside gantry cranes 7, respectively. Because the operation of the system 1 includes both gantry cranes 7 and overhead cranes 37 accessing containers C on the same platform 63, it is desirable to maintain separate areas of access to avoid a conflicting airspace.

Figure 4:
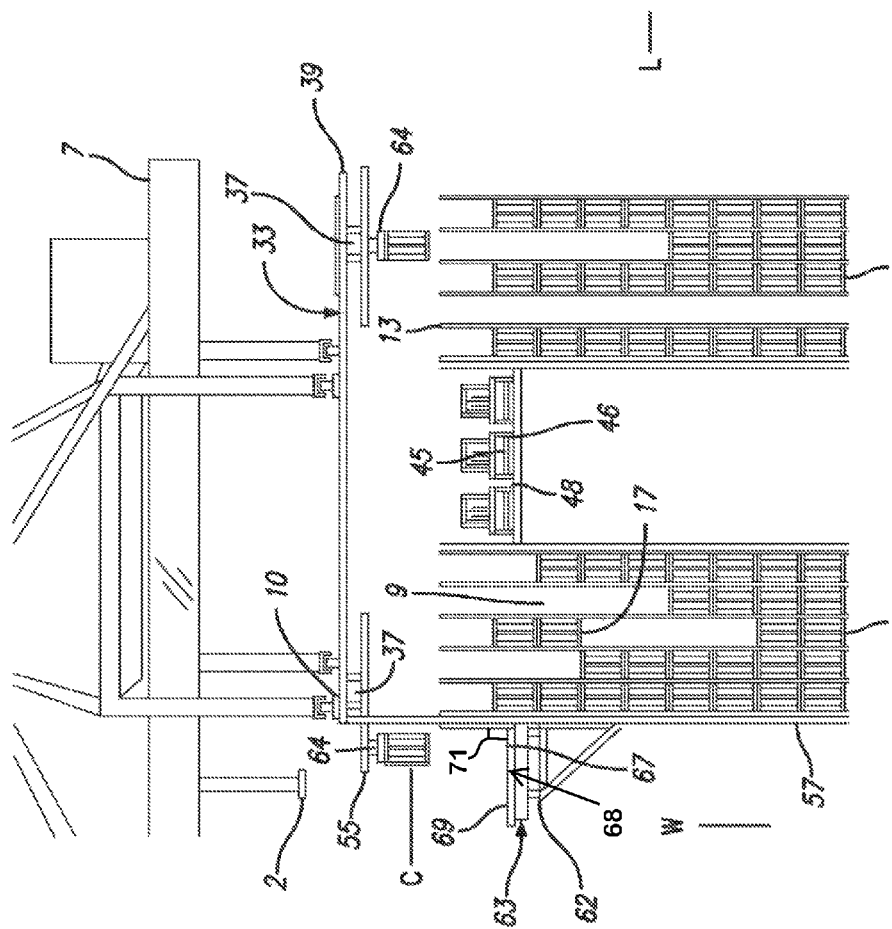
FIG. 4 is a partial side view of the embodiment of the system depicted in FIG. 1.
Figure 5:
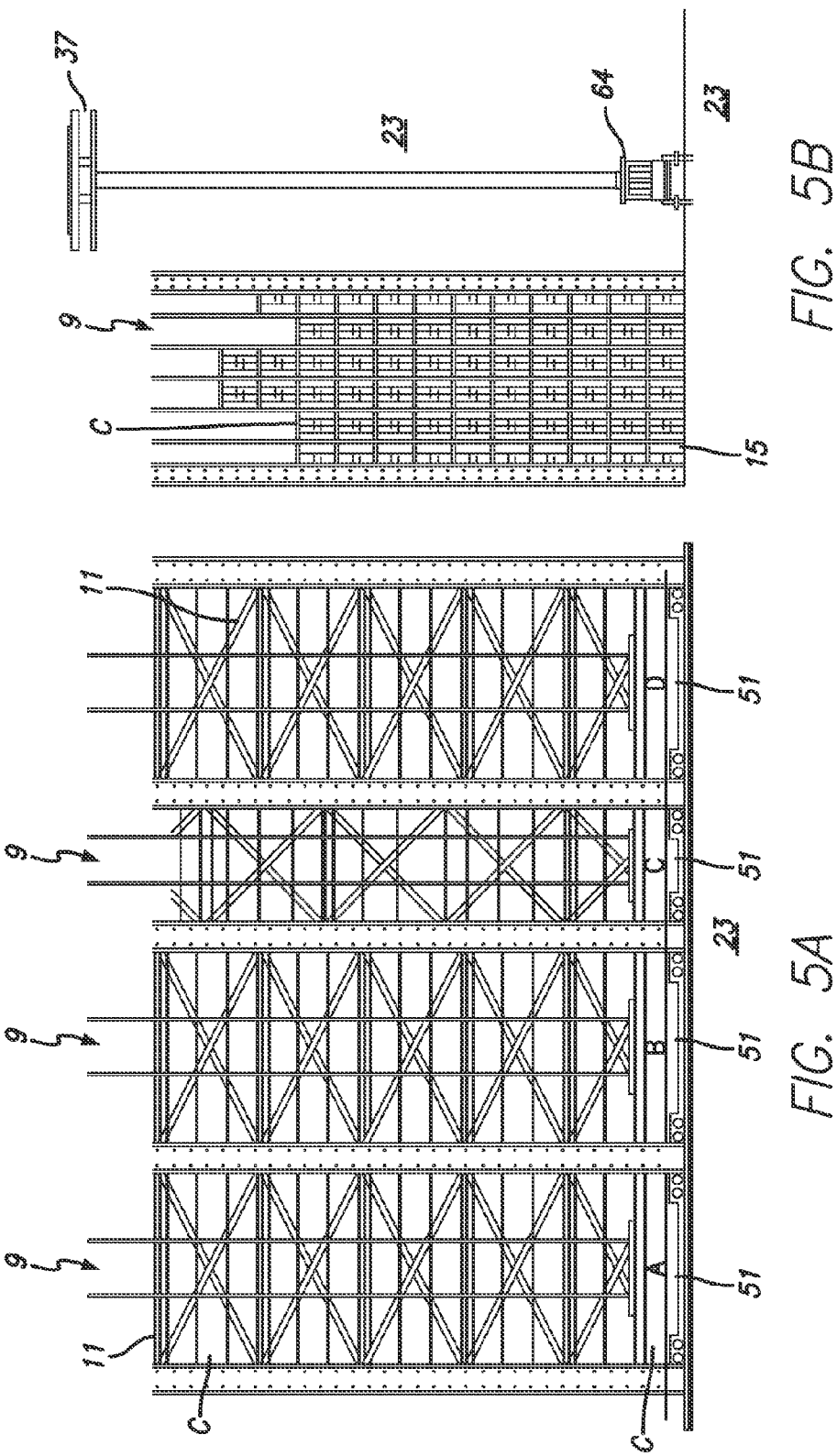
FIGS. 5A and 5B are front and side views of the intermodal yard and adjacent shafts, illustrating the relationship between the container lengths, the overhead cranes and the carbodies of the rail train.

As further shown in FIG. 4, the quayside gantry crane 7 is depicted as having an access to the second staging area 69 via crane spreader beam 73 and the overhead crane 37 is depicted as having an access to the first staging area 67 via an extension of periscope 55 that transports the container C across the outer wall 57 of the storage area. In a preferred embodiment, the first staging area 67 is on the side of the platform 63 closer to the plurality of storage shafts 9 and the second staging area 69 is on the side of the platform 63 closer to the quayside area. The platform 63 may include mechanical means to shift the container between the first and second positions.

Figure 7:
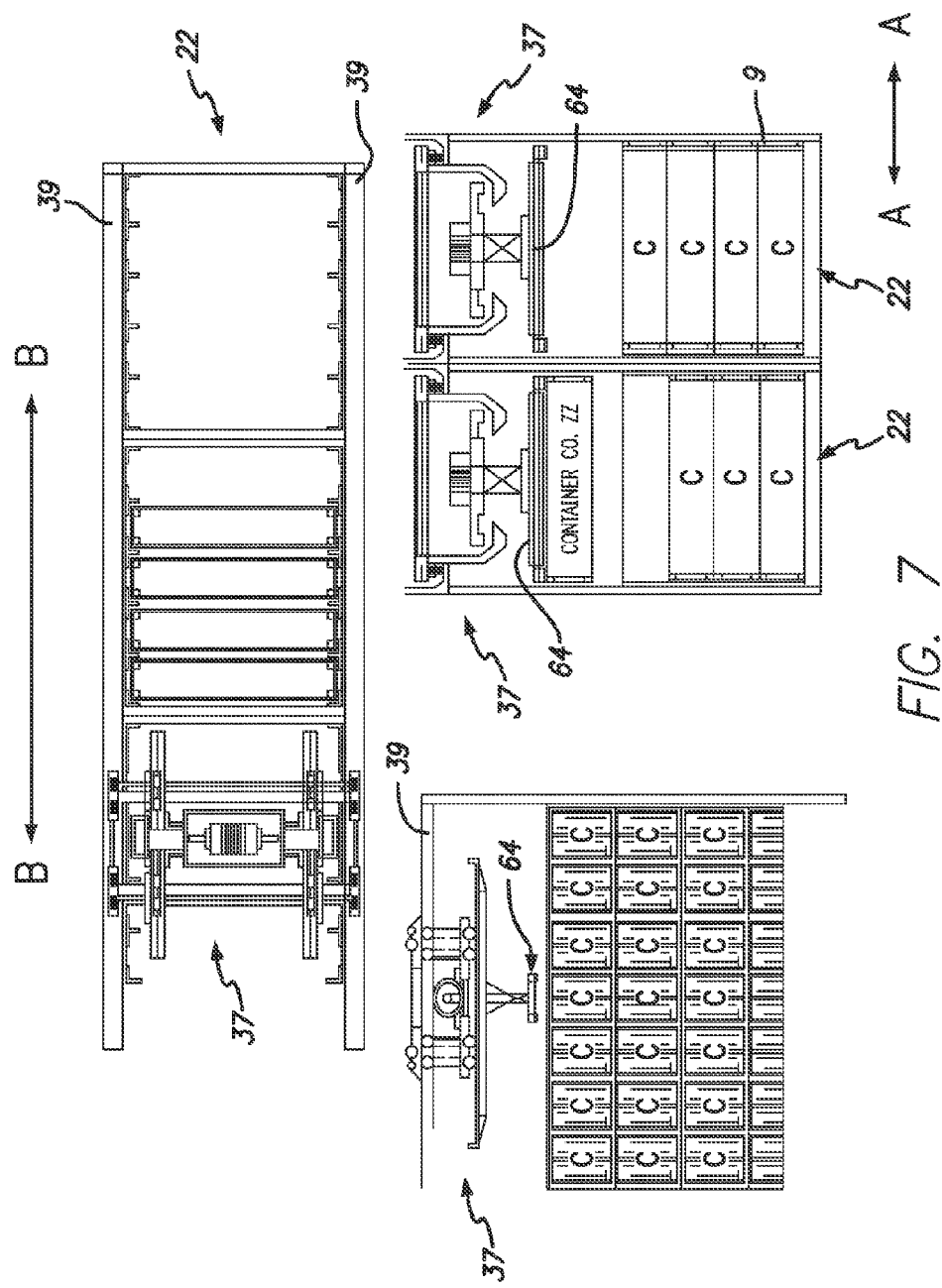
FIG. 7 depicts the operation of the overhead crane in transporting the container within the structural network.
Figure 8A:
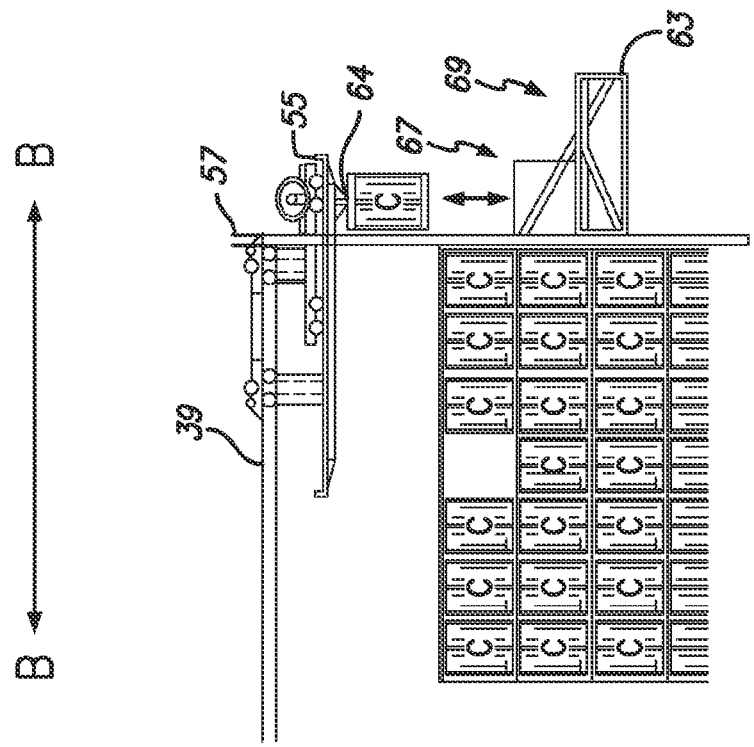
FIGS. 8A and 8B depict the operation of the overhead crane as it transports a container from a storage shaft onto a platform.
Figure 8B:
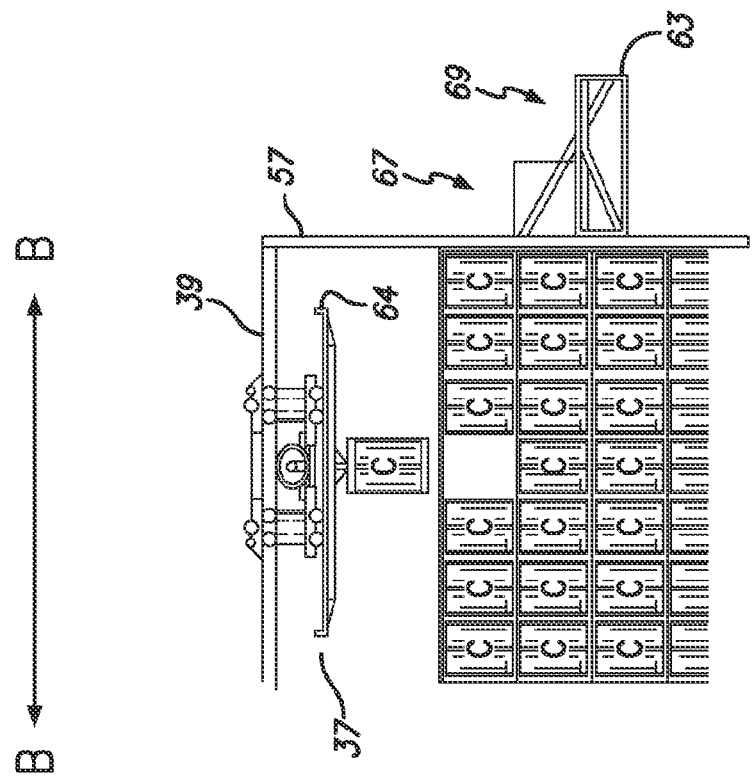

FIGS. 7-8 depicts one aspect of the operation of the overhead cranes 37. The overhead cranes 37 are each slidably associated with one of a plurality guideways 39 along the second axis B-B. The overhead cranes 37 attach to a container C via an associated hoist mechanism 64. In a preferred embodiment, the guideways 39 are disposed underneath the roof structure 33 and are limited to traveling in the direction of the second axis B-B only. As each one of the plurality of guideways 39 disposed underneath the roof structure 33 correspond to a row of storage shafts 9 along the second axis B-B, all of the storage shafts 9 accessible by any given overhead crane 37 are configured to store containers C of a corresponding or, more preferably, a single length. In one preferred embodiment, as the intermodal containers are ISO standard containers having one of five common standard lengths of 20, 40, 45, 48 and 53 feet, the rows of storage shafts 9 along the second axis B-B are configured to store one or a range of the foregoing container lengths.

Once the overhead crane 37 attaches to a container C delivered by the platform 63, the overhead crane 37 may transport the attached container C to the appropriate storage shaft 9 within that row based on any additional ones of a plurality of parameters other than its length, such as, for example, container contents, container weight, length of expected storage time, origin, destination, etc. Storage shafts 9 within a given row may be designated for containers based on any number of parameters based on the types of containers C that are stored. Alternatively, the overhead crane 37 may transport the attached container C directly to a second location. The second location may be a tunnel car 45 or a land-side docking area 23 comprising any one or more of a rail train 51 or other intermodal land vehicle, such as a truck.

The tunnel cars 45 travel along tracks 46 disposed along a pathway 48 that traverses the storage area along the first axis A-A. In one embodiment, different sets of tunnel cars 45 may be assigned for different length segments of the storage area along the first axis A-A. In an alternative embodiment, one or a plurality of tunnel cars 45 may traverse the entire length of the storage area via a tunnel car pathway 48. The tunnel cars 45 provide greater access between different rows of storage shafts 9 along the first axis A-A than is provided by the platforms 63 which are configured to access only a subset of the available storage shafts 9 rows. In a preferred embodiment, the tunnel car pathway 48 traverses the entire storage area along the first axis A-A.

It is desirable to position the tunnel cars 48 as close to the overhead cranes 37, but yet not so close as to interfere with the movement of the overhead cranes 37 and an attached container C as it intersects and passes over the tunnel car pathway 48. Positioning the tunnel cars 48 closer to the overhead cranes 37 reduces the distance that the containers C must travel to the tunnel cars 48 and thus the time that it will take to transfer the container C between the overhead cranes 37 and the tunnel cars 45. In a preferred embodiment, the tunnel car pathways 48 is preferably located at a distance from the roof structure 33 so as to not interfere with the path of the overhead crane 37 and any associated container C it may be transporting. Accordingly, in one embodiment, the tunnel cars 45 are configured to transport the containers just below a plane that extends across the tops of the storage shafts 9. This places the tunnel car 45 in sufficient proximity to the overhead cranes 37 without interfering with the range of airspace that is used by the overhead crane 37 when it is transporting a container C.

The storage area corresponds to the area that is occupied by the plurality of storage shafts 9 and is arranged in a grid pattern along a first axis A-A and a second axis B-B. While adjacent rows of the storage shafts 9 along the first axis A-A are identical, the storage shafts 9 within each row along the first axis A-A may have any one of a plurality of lengths. In contrast, while adjacent row of storage shafts 9 along the second axis B-B may be different with respect to the length of containers C they are configured to store, the storage shafts within each row long the second axis B-B is configured to store intermodal containers C of a corresponding length and, in some cases, identical lengths.

In a particularly preferred embodiment, the row of storage shafts along the first axis A-A will comprise repeating subunits of containers C having a plurality of lengths. FIGS. 9A-9B shows one exemplary subunit of nine (9) containers having lengths of 40, 40, 20, 40, 53/45, 40, 40, 20, and 40 feet containers. This pattern of nine (9) containers may be provided in a repeating fashion along the first axis A-A.

In another particularly preferred embodiment, the corresponding length of the containers C in the row along the second axis B-B is a single length. Thus, storage shafts 9 disposed in the row along the second axis B-B are configured to store, for example, only intermodal containers C which are 40 feet in length. Adjacent storage shafts 9 along the second axis B-B may store containers C of the same or another length, so long as all of the storage shafts 9 along that axis share a corresponding length. Thus, while storage shafts 9 in adjacent rows along the second axis B-B may store containers C of different lengths, the storage shafts 9 within a row along the second axis B-B are identical in that they are configured to store the containers C of corresponding lengths.

As explained above, each individual storage shaft 9 is configured to store containers C of a corresponding length. In a particularly preferred embodiment, the storage shaft 9 comprises structural girders 11 forming rectangular modules when fused, welded or otherwise attached to create a larger rectangular structure. The corresponding length of the storage shaft 9 may be a range of lengths (such as 45 to 52 feet) or a single length, as dictated by one of the lengths of a standard ISO container. As the standard ISO containers typically have a uniform height of about 8 feet, the height of the storage shaft 9 will generally correspond to the number of containers C desired to be stacked in a single shaft 9. In a preferred embodiment, all of the storage shafts 9 contained within a storage area have a uniform height. Regardless of the height, however, the storage shafts 9 within a storage area may have varying lengths based on the length of the container C a particular storage shaft 9 is intended to store.

Figure 6:
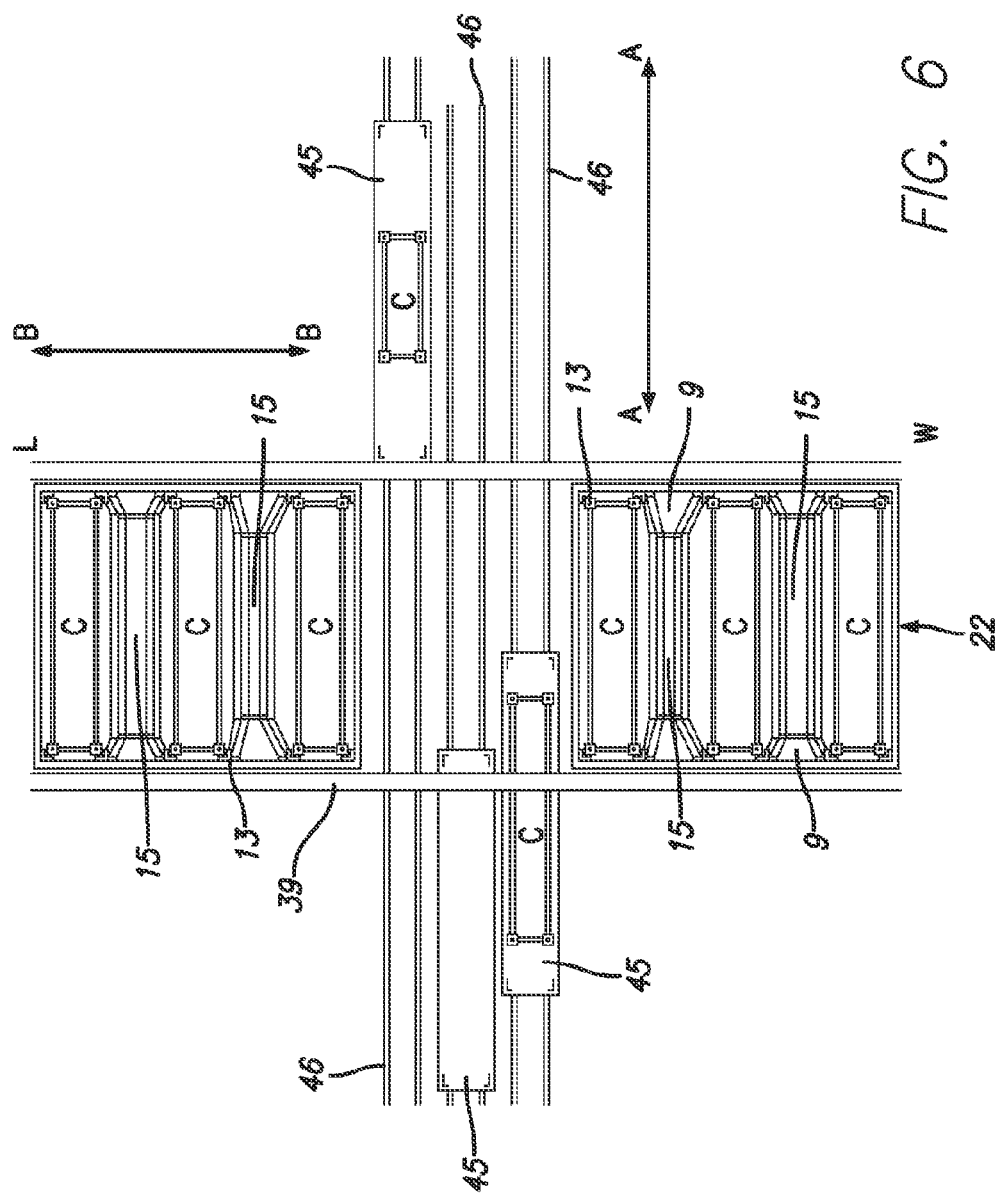
FIG. 6 is a top view of a row of shafts along the second axis and an intermodal rail yard along a first axis.

FIG. 6 depicts a row 22 of storage shafts 9 along the second axis B-B configured to store containers C of a single length. A total of twelve (12) storage shafts 9 are depicted in FIG. 6 in which alternating shafts 9 are depicted as having stored containers C. Thus, six (6) of the shafts 9 have containers C and the remaining six (6) are shown as being empty.

Each one of the storage shafts 9 is depicted as having a modular rectangular configuration having a floor 15 that is either at ground level, above ground level or below ground level. Guide tracks 13 are disposed along the vertical length of the storage shaft 9 to ensure that containers C of a selected dimension may be stacked on top of one another. As each of the eight corners of the containers C comprise castings or fittings with openings for twistlock fasteners, these castings constitute the points of contact between adjacent stacked containers C stored within the storage shaft 9. The guide tracks 13 are bolted, welded or otherwise fastened to vertical length of the storage shaft 9 ensure that that the containers C within a single storage shaft 9 are stacked on top of one another in substantial alignment at the corner castings. In a preferred embodiment, the guide tracks 13 are fitted to provide a close fit with the four corners of the containers C. The guide tracks 13 may include attachment points for a plurality of obstructing members which may couple the attachment points to create an elevated floor 17 as shown in FIG. 2.

As described above, storage shafts 9 along the second axis B-B may be configured to store containers C of a corresponding length. It is understood that containers C of a corresponding length may include those which may have different lengths (e.g., 45 and 53 feet), but may be handled and attached using a spreader associated with the overhead crane 37 having the same attachment points. Particularly in the case of 45- and 53-foot containers, it may be the case that in certain marine terminals, either one or both of the 45- and 53-foot containers are relatively uncommon as compared to containers of other sizes. Therefore, it may not be economical to dedicate an entire row of shafts 9 to a single one of these container lengths. Because 45- and 53-foot containers may be handled by a single spreader that may attach to both container sizes at attachment points at the same relative location, the hallway 22 corresponding to storage shafts 9 for these containers may be configured to have a width that at least accommodates the larger of the containers and the individual storage shafts 9 may be configured with guide tracks 13 that support either one of the 45- or 53-foot containers.

As more fully depicted in FIGS. 5A-B and 9A-B, the significance of the grid configuration of the structural network, in which the containers C are sorted based on their respective dimensions, particularly lengths, is that it permits a more efficient loading and unloading of the containers C onto and from rail trains having a plurality of carbodies, each having one or more specific length capacities, arranged in a configuration corresponding to at least a subset of the storage shafts 9 along the first axis A-A. Because containers C of a plurality of lengths are stored in a predetermined and repeating pattern along the first axis A-A, the containers C may be transferred between the structural network and intermodal marine or land vehicles configured to receive and transport the intermodal containers in the corresponding predetermined pattern. As a result of the congruence between configuration of the stored intermodal containers and configuration of the intermodal marine or land vehicles adapted to receive the intermodal containers, the loading and unloading of the intermodal containers may be performed synchronously between the structural network and the intermodal marine or land vehicles.

As shown in FIGS. 5A-B, a powered rail conveyer train 51 may be provided comprising a plurality of carbodies which may be flat cars or well cars. Each one of the carbodies is configured to accommodate one or more containers C of a length. Significantly, the arrangement of the individual carbodies and the distance between them is congruent with a subset of the containers C stored in shafts disposed along the first axis A-A. FIGS. 9A-9B depict one of a repeating subunit of a 9 well storage shafts 9 having corresponding overhead cranes 37 which deliver the containers C onto corresponding carbodies (51A-I)of a rail conveyer train 51. The distance between the adjacent stored containers C along the first axis A-A is identical to the distance between the adjacent containers C placed on the respective carbodies (51A-I) of the rail conveyer train 51.

In one preferred embodiment, the rail conveyer train 51 may have carbodies to each one of the corresponding shafts 9 to service the entirety of the row of shafts along the first axis A-A. In another preferred embodiment, the rail conveyer train 51 may have carbodies to a subset of the entire row of shafts along the first axis A-A.

While the operation of the system 1 will has been described in the context of transfer, storage and distribution of intermodal containers from the container ship S to the rail train 51, it is understood that the system 1 encompasses any number of other transfers and distribution of intermodal containers, such as the transfer of intermodal containers from the land-side docking area to the container ship S, the transfer of intermodal containers within the different storage shafts and within the same or different rows.

Moreover, owing to the modular nature of the system 1, it is understood that the structural network may be expanded in both directions along the first and second axes as dictated by the demands and capacity of a particular terminal. For example, the system in FIGS. 1-3 depict storage shafts 9 extending from both sides of the rail train 51 which may operate simultaneously in the manner as described above.

As implementation of the system 1 described herein produces a significantly faster and more efficient transfer of containers for intermodal transportation, while at the same time providing a greater capacity of storage of containers. Thus, with the implementation of the system 1, it becomes possible to consolidate to fewer marine terminals. This, in turn, results in a reduction of the rail/land network for transporting the containers from the marine terminals to further distribution points.

The system 1 may further comprise transfer storage and distribution areas located remotely from the marine terminal and connected by a substantially subterranean network. The transfer storage and distribution areas comprise a plurality of shafts arranged in the same manner as described with respect to those at the marine terminal, but may be of a smaller scale.

Figure 10:
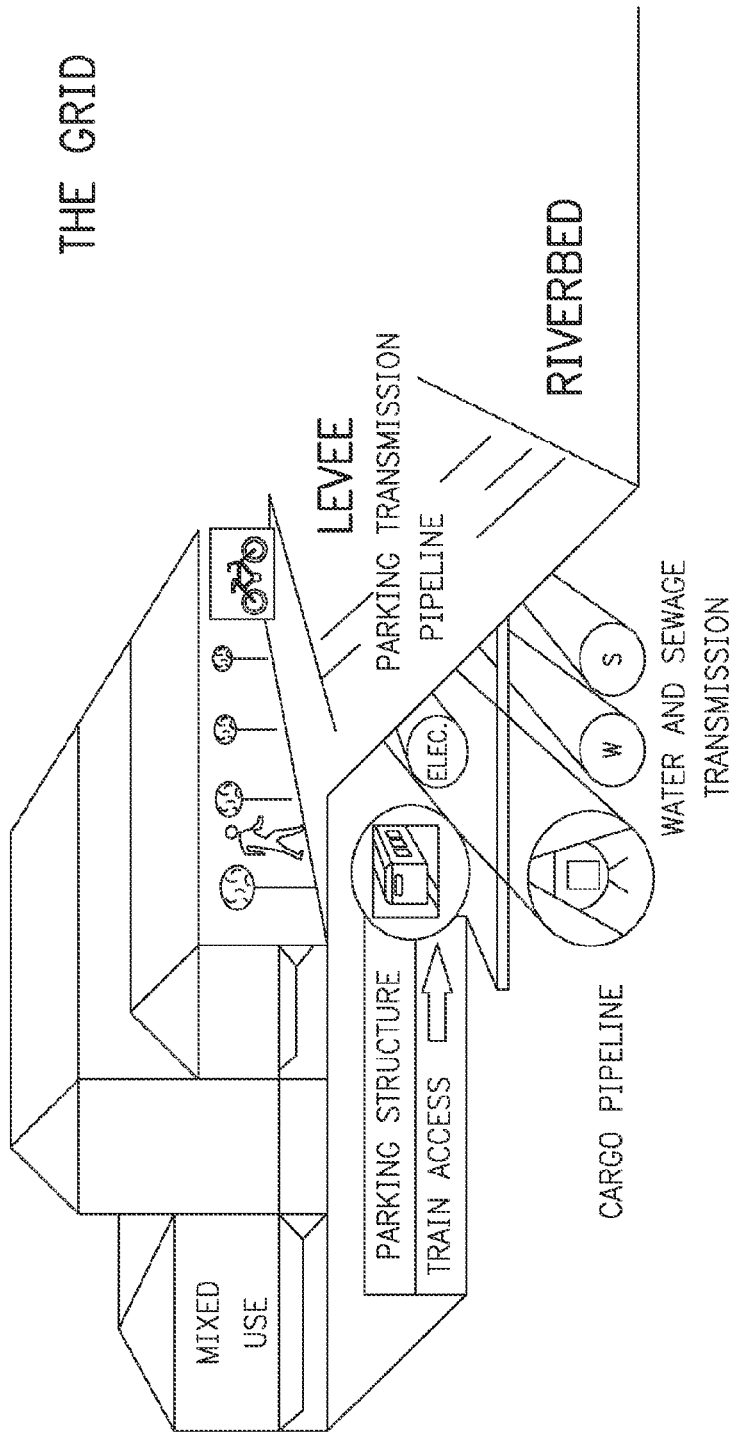
FIG. 10 illustrates the subterranean network comprising the rail train, passenger train, and utility network.

FIG. 10 depicts the expanded network that may be interconnected with the marine terminal depicted in FIGS. 1-3. The expanded network may comprise a subterranean cargo pipeline that is used by the rail train 51 to transport containers C from the marine terminal to other destinations, including the transfer storage and distribution areas. As the rail train 51 may be an unmanned and electrically powered, significant savings in manpower and energy are provided over transporting cargo via conventional over-land freight trains. A passenger transportation pipeline may additional be provided within or, more preferably, separately from the cargo pipeline. Additionally, the passenger transportation pipeline may be configured to interconnect with existing transportation network. Utility, water and sewage lines may similarly be disposed within or in separate pipelines.

The invention described and claimed herein is not to be limited in scope by the specific preferred embodiments disclosed herein, as these embodiments are intended as illustrations of several aspects of the invention. Indeed, various modifications of the invention in addition to those shown and described herein will become apparent to those skilled in the art from the foregoing description. Such modifications are also intended to fall within the scope of the appended claims.

The invention claimed is:

1. A system for the transfer, storage and distribution of intermodal containers of a plurality of lengths, the system comprising:
   a first storage area comprising a first plurality of vertically oriented container storage shafts arranged in a grid pattern along a first and second axis, wherein the shafts disposed in rows along the first axis are configured to store intermodal containers of a plurality of lengths and wherein the shafts disposed in a given row along the second axis are configured to store intermodal containers of a corresponding length;
   a plurality of gantry cranes slidably movable along the first axis and extending beyond the first storage area, the plurality of gantry cranes each configured to attach to and transport an intermodal container from a first location outside of the first storage area to one of a plurality of platforms slidably movable along the first axis, the platforms being located outside of the first storage area and positioned to deliver the intermodal container to one of the rows of the shafts along the first axis based on the length of the intermodal container;
   a roof structure is positioned over the first storage area a distance above the plurality of shafts, the roof structure comprises a plurality of tracks corresponding to the rows of the shafts along the second axis, wherein the plurality of gantry cranes are movably disposed on top of the roof structure; and
   a plurality of overhead cranes slidably associated with the plurality of tracks and disposed below the roof structure, the overhead cranes each configured to attach to and transport the intermodal container from the platforms to either one of the shafts or to a second location along the second axis.

2. The system of claim 1, wherein the first axis is substantially parallel to a quayside axis of a port and the second axis is substantially perpendicular to the first axis and wherein the first location is a container ship.

3. The system of claim 1, wherein the shafts disposed in each row corresponding to the second axis are configured to store intermodal containers of uniform lengths.

4. The system of claim 1, wherein the shafts disposed in at least one row along the second axis are configured to store intermodal containers within a range of lengths.

5. The system of claim 1, wherein the second location comprises any one or more of a tunnel car or a land-side docking area.

6. The system of claim 5, wherein the tunnel car is configured to traverse the rows of the shafts disposed on the first axis, the tunnel car configured to receive an intermodal container from one of the plurality of overhead cranes and deliver the intermodal container to another one of the plurality of overhead cranes.

7. The system of claim 6, wherein the tunnel car travels along a pathway that is substantially parallel to the first axis and located below the plurality of overhead cranes.

8. The system of claim 1, further comprising a land-side docking area comprising any one or more of a rail train or an intermodal land vehicle.

9. The system of claim 8, wherein the rail train comprises a plurality of carbodies, wherein each carbody is configured to support at least one intermodal container based on their respective lengths and wherein the plurality of carbodies are arranged in an order based on their respective container length capacities corresponding to the arrangement of the lengths of the intermodal containers contained in at least a subset of the row of storage shafts along the first axis.

10. The system of claim 9, wherein the distance between adjacent carbodies is configured to correspond to the distance between adjacent intermodal containers stored in the subset of the row of storage shafts along the first axis.

11. The system of claim 10, wherein each carbody has an assigned overhead crane and wherein the plurality of assigned overhead cranes are configured to load and unload a plurality of intermodal containers onto and from the container platforms of the rail train either separately or simultaneously.

12. The system of claim 1, wherein one of a plurality of the platforms is assigned to one of a plurality of the gantry cranes.

13. The system of claim 12, wherein the platforms are each configured to support at least two intermodal containers at a first and second staging area that is separately accessible by the overhead cranes and the gantry crane, respectively.

14. The system of claim 1, further comprising a bulk platform located external to the storage area, the bulk platform configured to receive cargo that is not an intermodal container and transport the cargo to a third location outside of the storage area.

15. The system of claim 1, wherein the shafts are interconnected rectangular modules constructed from structural girders.

16. The system of claim 15, wherein the shafts each comprise cell guide tracks forming an aligned plurality of the container cell bays.

17. The system of claim 16, wherein the container cell bays are rectangular sections and configured to support a container of a corresponding length.

18. The system of claim 1, wherein the shafts each comprise a floor that may be at ground level or positioned a desired height above or below ground level.

19. The system of claim 10, further comprising a transfer storage area located remotely from the first storage area, the transfer storage area comprising a third plurality of shafts arranged in a grid pattern along a first and second axis, wherein the shafts disposed in rows along the first axis are configured to store intermodal containers of a plurality of lengths corresponding to the arrangement of the lengths of intermodal containers on the carbodies of the rail train.

20. The system of claim 19, further comprising a rail network accessing the first storage area and the transfer storage area.

21. The system of claim 20, wherein the rail network is part of a substantially subterranean network.

22. The system of claim 21, wherein the subterranean network further comprises access for utility lines and access to at least one passenger transportation network.

23. A system for the transfer, storage and distribution of intermodal containers of a plurality of lengths, the system comprising:

a storage area comprising a roof structure and a plurality of vertically-oriented container storage shafts disposed under the roof structure, each storage shaft comprising a modular rectangular configuration of uniformly-sized container cell bays, the storage shafts arranged in a grid pattern along a first and second axis, wherein the shafts disposed in rows along the first axis are configured to store intermodal containers having different lengths and wherein the shafts disposed in a given row along the second axis are configured to store intermodal containers of a uniform length;

a plurality of gantry cranes disposed above the roof structure and slidably movable thereon along the first axis and extending beyond the storage area, the plurality of gantry cranes each configured to attach to and transport an intermodal container from a first location outside of the storage area to one of a plurality of platforms slidably movable along the first axis and disposed outside of the first storage area, the platforms being positioned to deliver the intermodal container to one of the rows of the shafts along the first axis based on the length of the intermodal container;

a plurality of overhead cranes disposed below the roof structure and slidably movable on along the second axis to attach to and transport the intermodal container from the platforms to either one of the shafts or to a second location along the second axis; and one or more tunnel cars disposed within the storage area below the overhead cranes and slidably movable along the first axis to transport intermodal containers between shafts disposed in rows along the first axis.

24. The system as recited in claim 23 wherein the platforms are each configured to support at least two intermodal containers at a first and second staging area thereon that is separately accessible by the overhead cranes and the gantry crane, respectively.

25. The system as recited in claim 23 wherein one of a plurality of the platforms is assigned to one of a plurality of the gantry cranes.

26. The system as recited in claim 23 further comprising a land-side docking area comprising any one or more of a rail train or an intermodal land vehicle.

27. The system of claim 23 further comprising a land-side docking area comprising a rail train, wherein the rail train comprises a plurality of carbodies each sized to accommodate at least one intermodal container, wherein the carbodies are arranged so that the size of each carbody corresponds with the arrangement of the lengths of the intermodal containers contained in at least a subset of the row of storage shafts along the first axis.

* * * * *